(12) United States Patent
Ryu et al.

(10) Patent No.: US 7,876,953 B2
(45) Date of Patent: Jan. 25, 2011

(54) APPARATUS, METHOD AND MEDIUM DISPLAYING STEREO IMAGE

(75) Inventors: Hee-seob Ryu, Yongin-si (KR); Soo-hyun Bae, Yongin-si (KR); Yong-beom Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1029 days.

(21) Appl. No.: 11/700,790

(22) Filed: Feb. 1, 2007

(65) Prior Publication Data
US 2007/0189599 A1 Aug. 16, 2007

(30) Foreign Application Priority Data
Feb. 15, 2006 (KR) .................. 10-2006-0014766

(51) Int. Cl.
G06K 9/00 (2006.01)
G06K 9/46 (2006.01)

(52) U.S. Cl. ........................... 382/154; 382/190

(58) Field of Classification Search ................ 382/154, 382/309, 190, 197; 345/419
See application file for complete search history.

(56) References Cited

U.S. PATENT DOCUMENTS 6,862,364 B1 * 3/2005 Berestov .................... 382/132
7,113,634 B2 * 9/2006 Yano ........................ 382/154

FOREIGN PATENT DOCUMENTS

| JP | 2004-283291 | 10/2004 |
|---|---|---|
| KR | 2003-0048013 | 6/2003 |
| KR | 10-2005-0102156 | 10/2005 |

\* cited by examiner

Primary Examiner—Daniel G Mariam
(74) Attorney, Agent, or Firm—Staas & Halsey LLP

(57) ABSTRACT

An apparatus, method, and medium displaying a stereo image compensates for errors between a left image and a right image to reduce eye fatigue experienced by a user. The apparatus includes a feature-point extractor to extract feature points of graphics objects included in a left image and a right image, of a stereo image, a representative-vector determiner to determine a representative vector among vectors between a predetermined point and the feature points, an error-correction unit to correct at least one of a vertical error and a rotation error between the left image and the right image using a difference between the representative vector determined in the left image and the representative vector determined in the right image, and a display unit to display the left image and the right image for which at least one of the vertical error and the rotation error has been corrected.

23 Claims, 8 Drawing Sheets

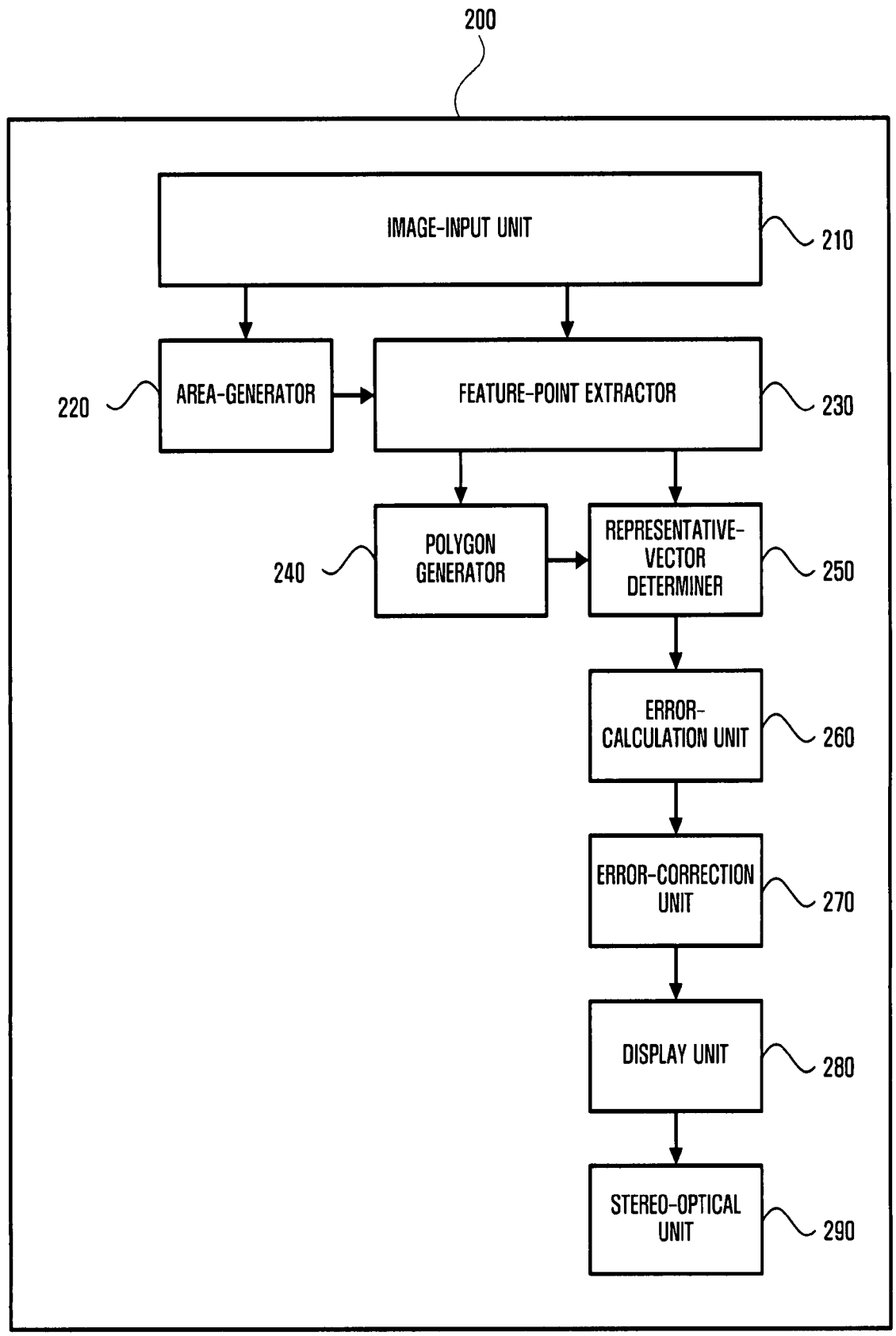

FIG. 5
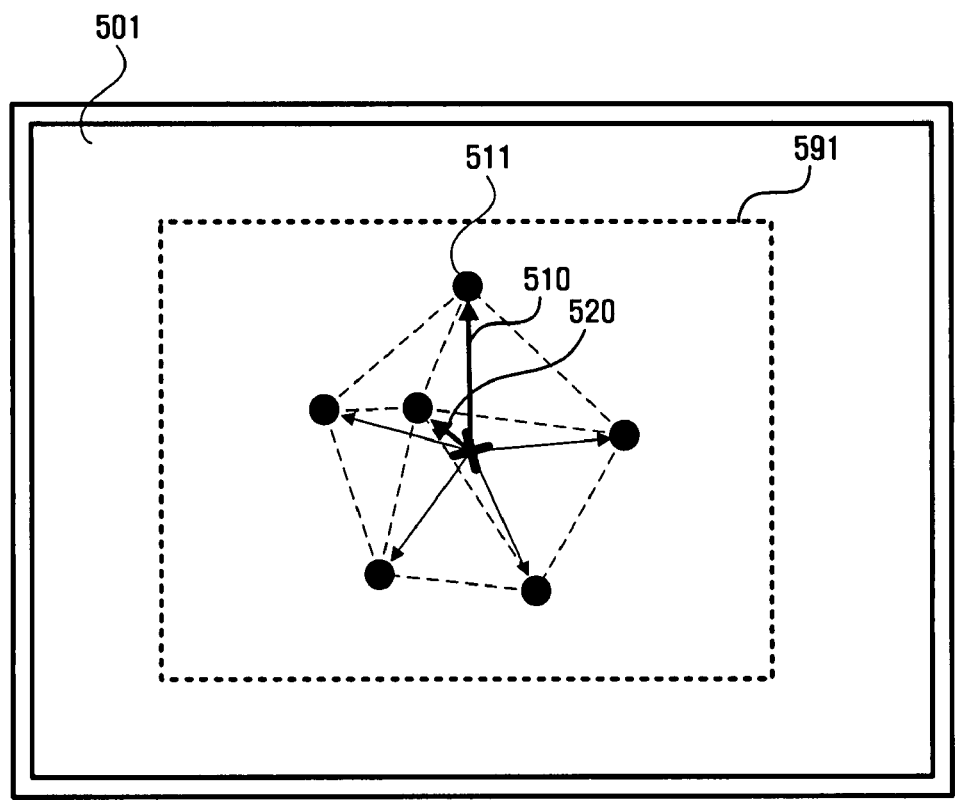
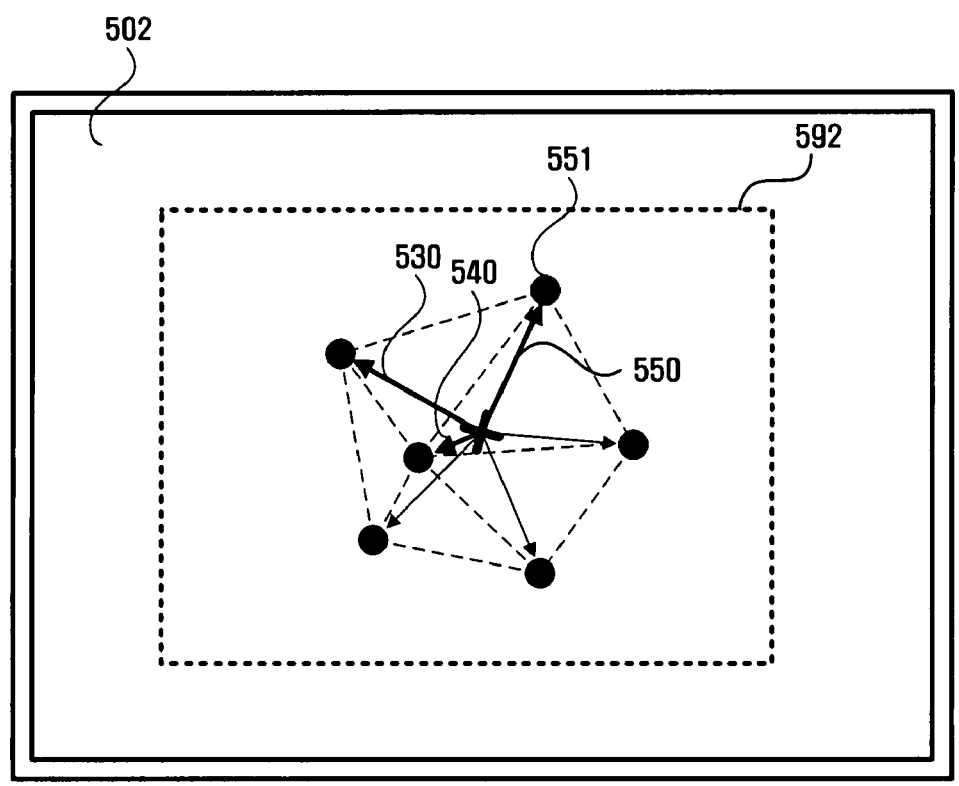

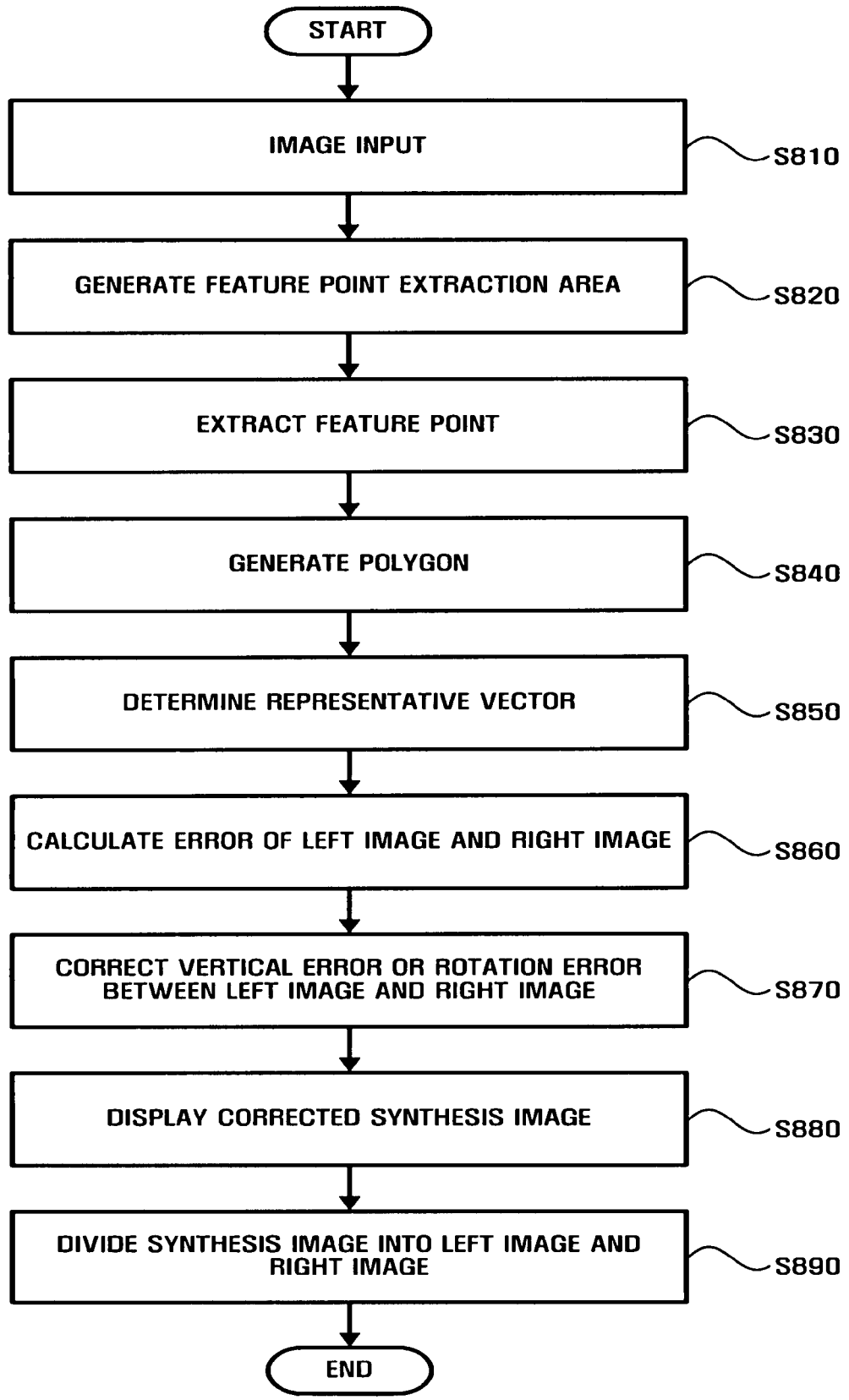

APPARATUS, METHOD AND MEDIUM DISPLAYING STEREO IMAGE

CROSS-REFERENCE TO RELATED APPLICATIONS

This application claims priority from Korean Patent Application No. 10-2006-0014766 filed on Feb. 15, 2006 in the Korean Intellectual Property Office, the disclosure of which is incorporated herein by reference in its entirety.

BACKGROUND

1. Field

One or more embodiments of the present invention relate generally to an apparatus, method and medium for displaying a stereo image, and more particularly to an apparatus, method and medium for displaying a stereo image, in which predetermined areas are set to a left image and a right image of a stereo image, and a vertical error and a rotation error of the left image and the right image are compensated for using a vector difference of polygons displayed in each area.

2. Description of the Related Art

Digital TV has emerged to fulfill consumer demand for improved picture quality. A digital TV provides improved picture quality, and uses a different screen aspect ratio, as compared with a conventional analog TV, thereby providing users with more vivid images.

The picture quality of an image is an important factor in a two-dimensional (hereinafter, referred to as 2D) image. Recently, consumer demand for three-dimensional (3D) stereo imaging has increased, such that research in the area of 3D stereo imaging has increased.

The techniques for viewing stereo images can be classified into a stereoscopy technique, in which a user cannot view a stereo image without wearing stereo glasses, or an autostereoscopy technique in which a user can view a stereo image without glasses. The stereoscopy technique includes a polarization operation and a time-division operation, while the autostereoscopy technique includes a parallax barrier operation and a lenticular operation.

Conventional 3D stereo image (hereinafter, referred to as stereo image) broadcasting systems have been developed in Japan, Europe, the U.S., and other countries, but the commercialization of these systems has been delayed mainly due to problems such as visual fatigue and the inconvenience to users of wearing stereo glasses.

Visual fatigue occurring from stereo image systems is typically caused by accommodation-convergence breakdown and crosstalk.

When a user views an object in the real world, accommodation and convergence are intrinsically linked. Accordingly, the user recognizes depth without feeling fatigue. However, when a user views a stereo image through a conventional stereo image system, a accommodation-convergence breakdown occurs due to the large disparity between the point at which the eyes of the user are focused, and the point at which the eyes of the user are converged. That is, the user's eyes focus on a plane of a screen and are simultaneously converged at a different 3D position, which is generated by disparity on the screen.

In addition, even when a portion of a displayed image has a depth that is outside a depth-of-focus (DOF) range of the user's eyes, the portion is clearly viewed. Consequently, a dual image created here causes eye fatigue.

Crosstalk occurs when the left image and the right image are not exactly divided in a stereo image system. That is, crosstalk occurs due to the incompletion of image switching in stereo glasses or the afterglow effect of a light-emitting device of a monitor. Further, even when the left image and the right image have been exactly divided, crosstalk may still exist because the degree of the division changes depending on a user's position.

When the display plane of a stereo image system is not perpendicular to the visual angle of a user, an image incident on both eyes of a user may be perceived as distorted.

The accommodation-convergence breakdown and crosstalk occur due to a horizontal error of the left image and the right image. Additionally, a vertical error or a rotation error of the left image and/or the right image may occur, also causing a user's eyes to become fatigued.

FIG. 1A illustrates a conventional stereo image including a vertical error, and shows that a vertical error $10a$ corresponding to "d" has occurred when arranging a graphics object $11a$ included in the left image, portion $1a$, and a graphics object $12a$ included in the right image, portion $2a$.

As shown in FIG. 1A, graphics object $13a$ is included in the observed image shown in portion $3a$, obtained by synthesizing the left image, portion $1a$, with the right image, portion $2a$. Accordingly, since the vertical error $10a$ corresponding to "d" exists in graphics object $13a$, a user's eyes become fatigued.

FIG. 1B illustrates a conventional stereo image including a rotation error. FIG. 1B further shows that a rotation error $10b$ corresponding to "θ" has occurred when arranging a graphics object $11b$ included in the left image, portion $1b$, and a graphics object $12b$ included in the right image, portion $2b$.

Accordingly, since the rotation error $10b$ corresponding to "e" exists in a graphics object $13b$ included in an observed image, portion $3b$, obtained by synthesizing the left image, portion $1b$, with the right image, portion $2b$, a user's eyes become fatigued.

Korean Unexamined Patent No. 2005-0102156 discusses a technique where a disparity map including occlusion areas is formed by applying a disparity value of an input stereo image to a reference image, and each graphics object within the stereo image is divided by applying a predetermined threshold value to the disparity map compensated according to relative positions of graphics objects within the reference image, and a multi-view stereo image different from the stereo image is generated by differentially and horizontally shifting the graphics objects divided according to a horizontal parallax method.

However, the technique discussed in Korean Unexamined Patent No. 2005-0102156 only proposes generating a multi-view stereo image through horizontal shift of the left image and the right image, but does not avoid vertical and rotation errors.

Therefore, an apparatus, method and medium compensating for such vertical and rotation errors in displaying a stereo image has been found desirable by the inventors.

SUMMARY

Accordingly, one or more embodiments of the present invention has been made to solve the above-mentioned problems, with an aspect being to set predetermined areas in a left image and a right image, matching up a stereo image, and compensate for a vertical error and a rotation error of the left image and the right image using a vector difference of polygons displayed in each area.

Additional aspects and/or advantages of the invention will be set forth in part in the description which follows and, in part, will be apparent from the description, or may be learned by practice of the invention.

To achieve at least the above and/or other aspects and advantage, one or more embodiments of the present invention include an apparatus for displaying a stereo image, the apparatus including a feature-point extractor to extract feature points of graphics objects included in a left image and a right image, included in a stereo image, a representative-vector determiner to determine a representative vector among vectors between a predetermined point and the feature points for the left image and the right image, respectively, and an error-correction unit to correct at least one of a vertical error and a rotation error between the left image and the right image using a difference between the representative vector determined in the left image and the representative vector determined in the right image.

To achieve at least the above and/or other aspects and advantage, one or more embodiments of the present invention include a method of displaying a stereo image. The method includes extracting feature points of graphics objects included in a left image and a right image, included in a stereo image, determining a representative vector among vectors between a predetermined point and the feature points for the left image and the right image, respectively, and correcting at least one of a vertical error and a rotation error between the left image and the right image using a difference between the representative vector determined in the left image and the representative vector determined in the right image.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 illustrates an apparatus for displaying a stereo image, according to one or more embodiments of the present invention;

FIG. 5 illustrates a process for determining a representative vector, according to one or more embodiments of the present invention;

FIG. 8 illustrates a process for displaying a stereo image, according to one or more embodiments of the present invention.

DETAILED DESCRIPTION OF EMBODIMENTS

Figure 1A:
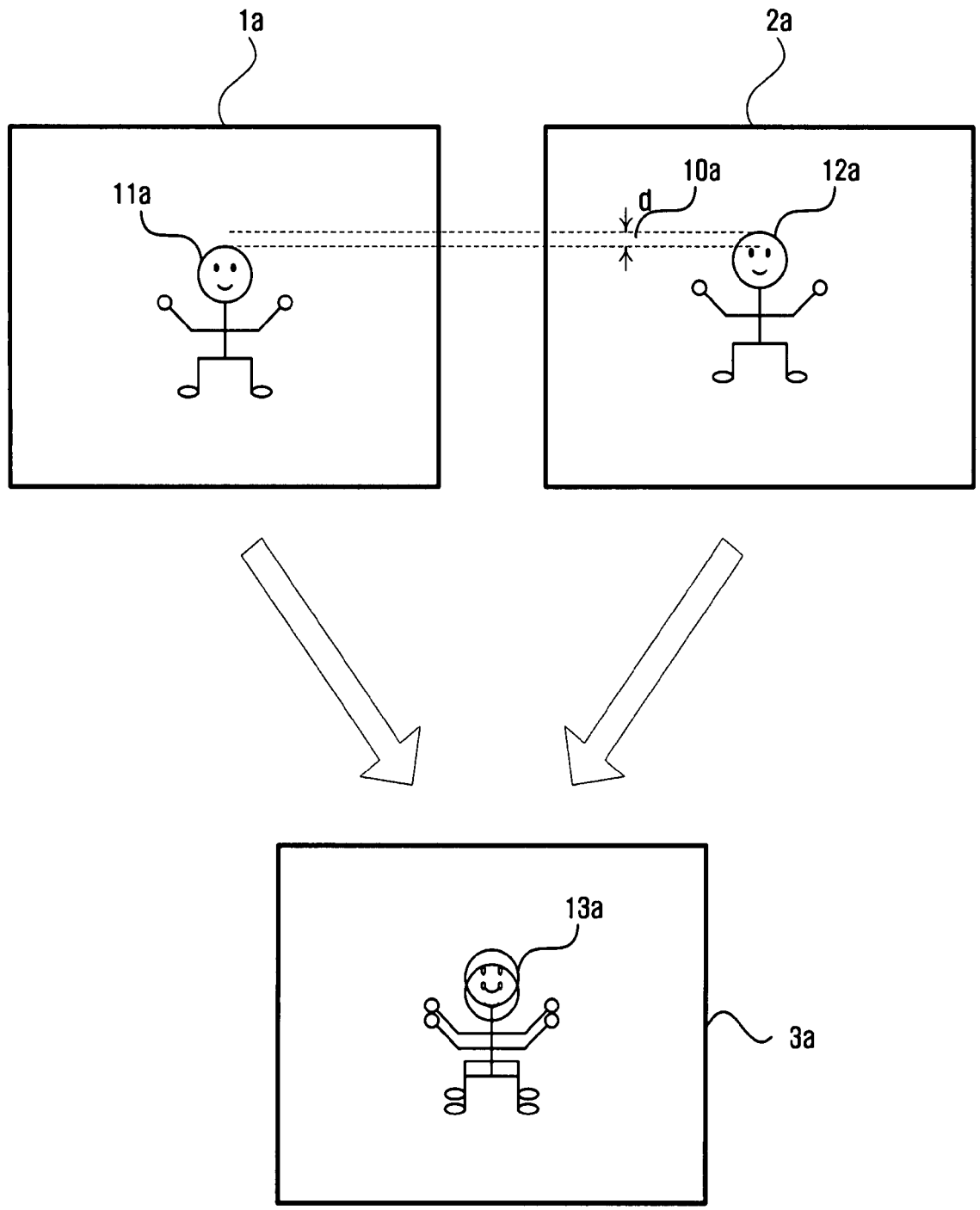
FIGS. 1A and 1B illustrate conventional stereo images having a vertical error or a rotation error, respectively.
Figure 1B:
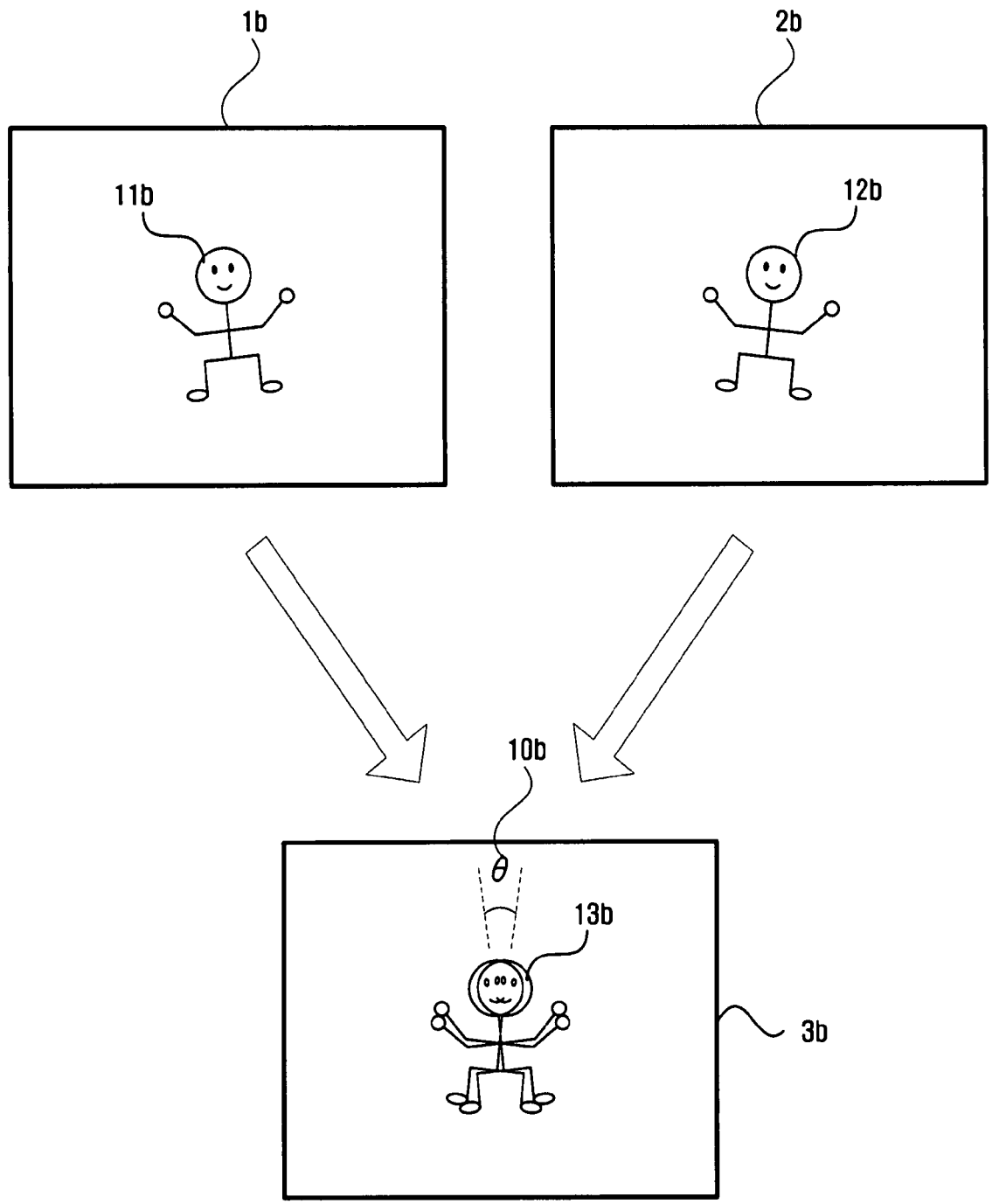

Reference will now be made in detail to one or more embodiments of the present invention, examples of which are illustrated in the accompanying drawings, wherein like reference numerals refer to the like elements throughout. One or more embodiments are described below to explain the present invention by referring to the figures.

FIG. 2 illustrates an apparatus for displaying a stereo image, according to one or more embodiments of the present invention. The apparatus (hereinafter, referred to as stereo image apparatus) 200 for displaying a stereo image may include an image-input unit 210, an area-generator 220, a feature-point extractor 230, a polygon generator 240, a representative-vector determiner 250, an error-calculation unit 260, an error-correction unit 270, a display unit 280 and a stereo-optical unit 290, for example.

The image-input unit 210 may receive a 2D image, which may be an image stored in a storage unit (not shown) or an image transferred through a network by a predetermined communication protocol, for example. Further, the 2D image may include an image for each eye of a user so that the 2D image may be converted to a stereo image. That is, the 2D image may include an image (hereinafter, referred to as left image) for a left eye and an image (hereinafter, referred to as right image) for a right eye.

The area-generator 220 may generate a predetermined area (hereinafter, referred to as feature point extraction area) for extracting feature points of graphics objects included in the left image and the right image. The feature point extraction area may correspond to an entire area or a partial area of the left image or the right image. Generating a partial area of an image as the feature point extraction area, rather than the entire area, may reduce an operation load. Further, when the feature point extraction area corresponds to a partial area of an image, the size, shape and position of the feature point extraction area may be manually determined by a user, or may also be automatically determined by the area-generator 220.

The feature-point extractor 230 may extract feature points of graphics objects included in the left image and the right image, which together make up a stereo image. In other words, the feature-point extractor 230 may extract feature points of graphics objects included in the feature point extraction area. The feature-point extractor 230 may determine positions of each vertex corresponding to a viewpoint in order to express a 3D polygon model as a polygon mesh of a triangle, for example. In order to express a complicated 3D polygon model, the feature-point extractor 230 may generate a simplified polygon model in which the number of feature points or corners has been reduced. Further, the feature-point extractor 230 may extract feature points using the same algorithm when extracting feature points of the left image and the right image.

The polygon generator 240 may generate a polygon in which the feature points of the graphics objects extracted by the feature-point extractor 230 are interconnected. In other words, the polygon generator 240 may compute both coordinates and colors of vertexes of a triangle displayed through the display unit 280 according to the polygon model generated by the feature-point extractor 230. That is, the polygon generator 240 may remove invisible sides or vertexes, and restructure a triangle cut by a screen corner. When a light source is used for graphics objects, the polygon generator 240 may estimate the effect of the light source on normal vectors of each side, for example, thereby computing the colors of each vertex.

Further, the polygon generator 240 may also generate internal pixel information of a triangle for the coordinates and colors of vertexes of the triangle. That is, the polygon generator 240 may compute the colors of pixels on a screen, to which an image is actually output, using the colors of the vertexes of the triangle and the coordinates on the screen, and may store the computed colors in a pixel buffer. In other words, the polygon generator 240 may perform at least one computation for each pixel output to the screen.

The representative-vector determiner 250 determines a vector, hereinafter, referred to as representative vector, that is representative among vectors between a predetermined point and feature points on an image area. That is, the representative-vector determiner 250 may set the predetermined point as a reference point, may check the direction and sizes of the feature points with respect to the reference point, and determine direction and size orienting one feature point of the feature points as the representative vector.

Here, a vector, which is nearly vertical or horizontal, may be determined as the representative vector among vectors between the center of a polygon, which are generated based on the feature points, and the feature points, for example. Further, the representative-vector determiner 250 may also determine multiple vectors, as well as one vector, as the representative vectors.

The error-calculation unit 260 may calculate an error between the representative vector of the left image and the representative vector of the right image, i.e. may calculate differences between both directions and sizes of the two representative vectors. The error-calculation unit 260 may calculate an error between vectors using only one representative vector respectively determined in the left image and the right image, or may also calculate an error between vectors using multiple representative vectors respectively determined in the left image and the right image, for example.

The error-correction unit 270 may correct a vertical error or a rotation error between the left image and the right image using the error calculated by the error-calculation unit 260. That is, the error-correction unit 270 may perform a geometrical transformation on the left image or the right image, thereby reducing the vertical error or the rotation error.

Here, when a difference between the representative vector of the left image and the representative vector of the right image meets a predetermined threshold value, the error-correction unit 270 may correct the vertical error and/or the rotation error. That is, the error-correction unit 270 may set the left image or the right image as a reference image and may vertically shift or rotate the right image or the left image with respect to the reference image, thereby reducing the vertical error or the rotation error. The correction for the vertical error and the rotation error will be described in more detail with reference to FIGS. 6 and 7.

The display unit 280 may display the left image and the right image in which the vertical error and/or the rotation error has been corrected. As the left image and the right image are displayed at the same time, a depth clue, such as optical information including, but not limited to, binocular disparity and motion parallax may be included in the displayed images. The depth clue may allow both eyes to recognize the 3D depth.

Further, the images displayed by the display unit 280 may also include a clue for allowing a single eye to recognize the 3D depth. The depth clue for a single eye may include, one or more of, reflection due to light, effect due to shadow, a relative size in which a nearer object is more largely seen, overlap due to a different object, a texture change in which a nearer texture is more clearly seen, a spatial perspective in which a remote object is more indistinctly seen, a motion parallax in which a nearer object is seen as it goes fast, and perspective, for example.

The display unit 280 may correspond to a module having an image display that can display input signals such as a Cathode Ray Tube (CRT), a Liquid Crystal Display (LCD), a Light-Emitting Diode (LED), an Organic Light-Emitting Diode (OLED) and a Plasma Display Panel (PDP). Further, the display unit 280 may display a 2D image for input image signals.

For example, the stereo-optical unit 290 may convert a 2D image transferred from the display unit 280 into a stereo image. That is, the stereo-optical unit 290 may divide the 2D image into a left image and a right image, and, in an embodiment, transfer an image for a left eye to a left eye, and transfer an image for a right eye to a right eye, thereby allowing a user to observe a stereo image.

The function of the stereo-optical unit 290 may be realized using, for example, a parallax barrier operation or a lenticular operation.

The parallax barrier operation is a technique of displaying a stereoscopic image using a parallax barrier. A parallax barrier refers to a sheet having slit-like openings arranged in a row. When left-eye and right-eye images or multi-eye images are alternated on a rear surface of the parallax barrier at regular intervals, a stereoscopic image can be viewed with the naked eye through the openings from a certain distance.

In the lenticular operation, a lenticular sheet having an arrangement of small lenses is arranged instead of a barrier, so that a left eye image and a right eye image or multi-eye images are divided and thus a stereo image is realized. Since the left-eye and right-eye images divided from the 2D image can be viewed through the stereoscopic optical unit 290, the user can observe a stereo image without wearing stereo glasses.

Further, the stereo-optical unit 290 may divide a 2D image including a left image and a right image into stereo images for a left eye and a right eye using a polarization method or a time-division method, so that it is also possible to generate a stereo image for stereo glasses, for example.

Figure 3:
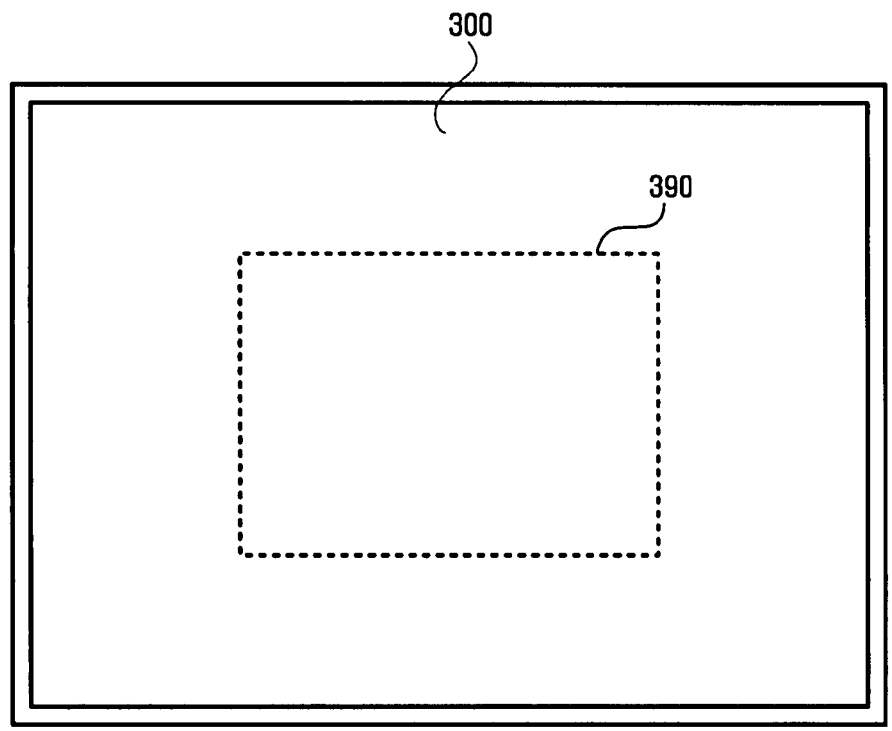
FIG. 3 illustrates a feature point extraction area, according to one or more embodiments of the present invention.

FIG. 3 illustrates a feature point extraction area according to one or more embodiments of the present invention, and shows, as an example, a feature point extraction area 390 having a predetermined size and a rectangle-shape, in a left image or a right image 300. In FIG. 3, a partial area of a screen is determined as the feature point extraction area 390. However, the entire area of the screen may also be determined as the feature point extraction area 390.

The size, position and shape of the feature point extraction area 390 may be optionally determined by a user or may also be automatically determined by the area-generator 220. For example, the feature point extraction area 390 may correspond to ¼ of the image area 300 and may be disposed in the middle of the screen, noting that alternate embodiments are equally available.

In order to automatically determine the size, position and shape of the feature point extraction area 390, the area-generator 220 may analyze an input image. For example, the area-generator 220 may exclude an area such as an image of a beach, from which it is difficult to extract feature points, from the feature point extraction area 390, and may instead determine an area of an image with a high frequency as the feature point extraction area 390.

To this end, the area-generator 220 performs analysis for the left image or the right image 300, or both, and applies the size, position and shape of the feature point extraction area 390, determined based on the comparison results, to the left image and the right image in the same manner. For example, after performing analysis for a left image and generating the feature point extraction area 390 based on the analysis results, the area-generator 220 may apply a feature point extraction area to a right image, which has the same size, position and shape as those of the feature point extraction area generated for the left image. Accordingly, the same graphics objects included in the left image or the right image are transferred to the feature-point extractor 230, and the feature-point extractor 230 can extract feature points of the same graphics objects.

Figure 4:
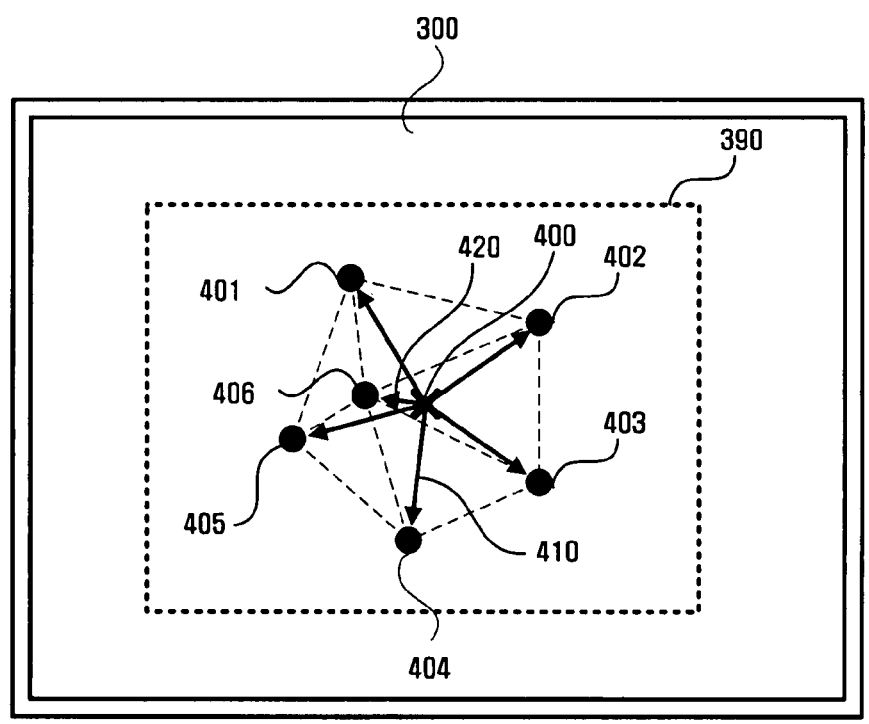
FIG. 4 illustrates a process for determining a representative vector, according to one or more embodiments of the present invention.

FIG. 4 illustrates a process for determining a representative vector according to one or more embodiments of the present invention. Further, FIG. 4 illustrates a process for determining one of the vectors between feature points 401 to 406 of graphics objects, which are included in the feature point extraction area 390 of the left image or the right image 300, or both, and a reference point 400, as a representative vector.

Here, it has been assumed, as only an example, that the reference point 400 is set as the center of a polygon generated through the connection of graphics objects, i.e., feature points. In this way, vectors are formed between the reference point 400 and the feature points. The representative-vector determiner 250 may determine a vector, which is nearly vertical or horizontal, among the vectors as the representative vectors 410 and 420. In FIG. 4, since the vector 410 between the reference point 400 and the fourth feature point 404 is nearly vertical, and the vector 420 between the reference point 400 and the sixth feature point 406 is nearly horizontal, the vector 410 or the vector 420 may be determined as a representative vector.

In FIG. 4, the reference point 400 represents the center of the polygon. However, the reference point may also be optionally determined by a user or may also be automatically determined by the representative-vector determiner 250, for example. In an embodiment, when the reference point 400 is automatically determined by the representative-vector determiner 250, the representative-vector determiner 250 determines one of the feature points in a left image as a reference point, and determines a vector, which is nearly vertical and horizontal, among vectors between the reference point and other feature points included in the left image, as a representative vector. Further, the representative-vector determiner 250 sets a coordinate, which may be the same as that of the feature point determined as the reference point in the left image, as the reference point of a right image, and determines a vector, which is nearly vertical and horizontal, among vectors between this reference point and feature points included in the feature point extraction area of the right image with respect to the reference point, as a representative vector.

When determining a representative vector, the representative-vector determiner 250 may also consider the size of a vector. That is, the representative-vector determiner 250 extracts a predetermined vector, which is nearly vertical or horizontal, from the left image and the right image, extracts a vector having a similar size as that of the predetermined vector, from each image, and determines the extracted vector as a representative vector, for example.

FIG. 5 illustrates a process for determining a representative vector according to one or more embodiments of the present invention, and illustrates a process for determining multiple vectors as representative vectors.

It may be improper to determine only one vector as a representative vector and then perform correction for the representative vector. For example, in FIG. 5, since a representative vector 510 in a left image 501 and a representative vector 550 in a right image 502 are nearly perpendicular to a screen and have a similar size, the two vectors 510 and 550 may be determined as representative vectors by the representative-vector determiner 250. However, both the feature point 511, which corresponds to the representative vector 510 in the left image 501, and the feature point 551, which corresponds to the representative vector 550 in the right image 502, are different feature points in a polygon of the same graphics objects. Accordingly, if a corresponding image correction is performed, a rotation error of the left image 501 and the right image 502 increases.

Accordingly, the representative-vector determiner 250 of one or more embodiments of the present invention can determine multiple representative vectors. It may be advantageous for the multiple representative vectors to include a vector with the largest size and a vector with the smallest size, for example. That is, the representative-vector determiner 250 may determine both the first vector 510 nearly perpendicular to the screen in the left image 501 and the second vector 520, with the smallest size, as representative vectors, and may determine both the fifth vector 550, nearly perpendicular to the screen in the right image 502, and the fourth vector 540, with the smallest size, as representative vectors. Here, since a large difference may exist for an angle (hereinafter, referred to as reference vector angle) between the first vector 510 and the second vector 520, and an angle between the fourth vector 540 and the fifth vector 550, the representative-vector determiner 250 may extract combinations of vectors, which form an angle similar to the reference vector angle, from the right image 502. Here, since the representative-vector determiner 250 extracts the combinations of vectors in consideration of the sizes of the vectors as well as angles among the vectors, the representative-vector determiner 250 may determine the third vector 530 and the fourth vector 540 as the representative vectors of the right image 502.

Further, the representative-vector determiner 250 may also determine a vector sum, which is obtained by summing up all vectors between the reference point and each feature point, as a representative vector, for example.

Figure 6:
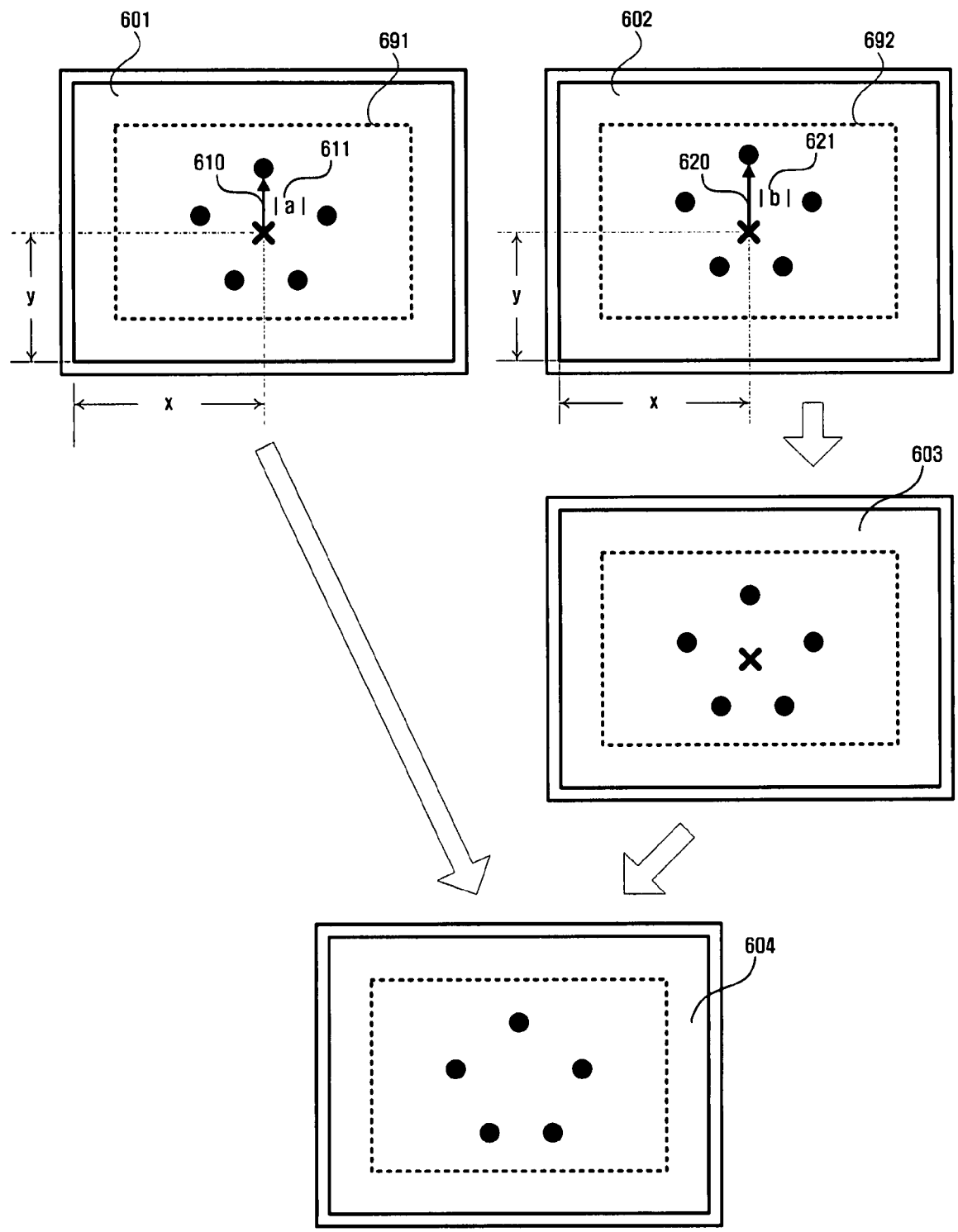
FIG. 6 illustrates a vertical error correction, according to one or more embodiments of the present invention.

FIG. 6 illustrates a vertical error correction according to one or more embodiments of the present invention, and shows a left image 601 and a right image 602, in which no rotation error exists and only a vertical error exists, as an example.

In FIG. 6, feature point extraction areas 691 and 692 generated by the area-generator 220 are respectively disposed in the left image 601 and the right image 602 in the same position, size and shape. Further, the feature-point extractor 230 extracts feature points, and the representative-vector determiner 250 determines the representative vectors 610 and 620, respectively, of the left image 601 and the right image 602.

Accordingly, and continuing the example, the vectors 610 and 620, which are nearly vertical in the left image 601 and the right image 602, are determined as representative vectors, respectively, and are transferred to the error-calculation unit 260. Further, the error-calculation unit 260 confirms angle and size differences between the representative vectors 610 and 620 of the left image 601 and the right image 602. The error-calculation unit 260 checks that a difference exists in the sizes of the representative vectors 610 and 620. That is, the error-calculation unit 260 confirms that the representative vector 610 of the left image 601 has a size 611 of |a| and the representative vector 620 of the right image 602 has a size 621 of |b|. As a result, the error-calculation unit 260 confirms that an error between the left image 601 and the right image 602 corresponds to |a|-|b|.

The error between the left image 601 and the right image 602, which may be calculated by the error-calculation unit 260, may be transferred to the error-correction unit 270. The error-correction unit 270 may perform a geometrical transformation for the right image 602 based on the received error. That is, the error-correction unit 270 may vertically shift the right image 602 by |a|-|b|. In this way, the left image 601, which corresponds to a reference image, and the corrected right image 603 may be transferred to the display unit 280. Accordingly, the display unit 280 may display the received synthesized image 604.

In FIG. 6, the left image 601 is set as a reference image and an image correction is performed for the right image 602. However, the right image 602 may be set as a reference image and an image correction may be performed for the left image 601. Further, an image correction may also be performed for the left image 601 and the right image 602 by half of the error between the left image 601 and the right image 602. That is, the left image 601 may be vertically shifted upward by (|a|−|b|)/2 and the right image 602 may be vertically shifted downward by (|a|−|b|)/2.

Figure 7:
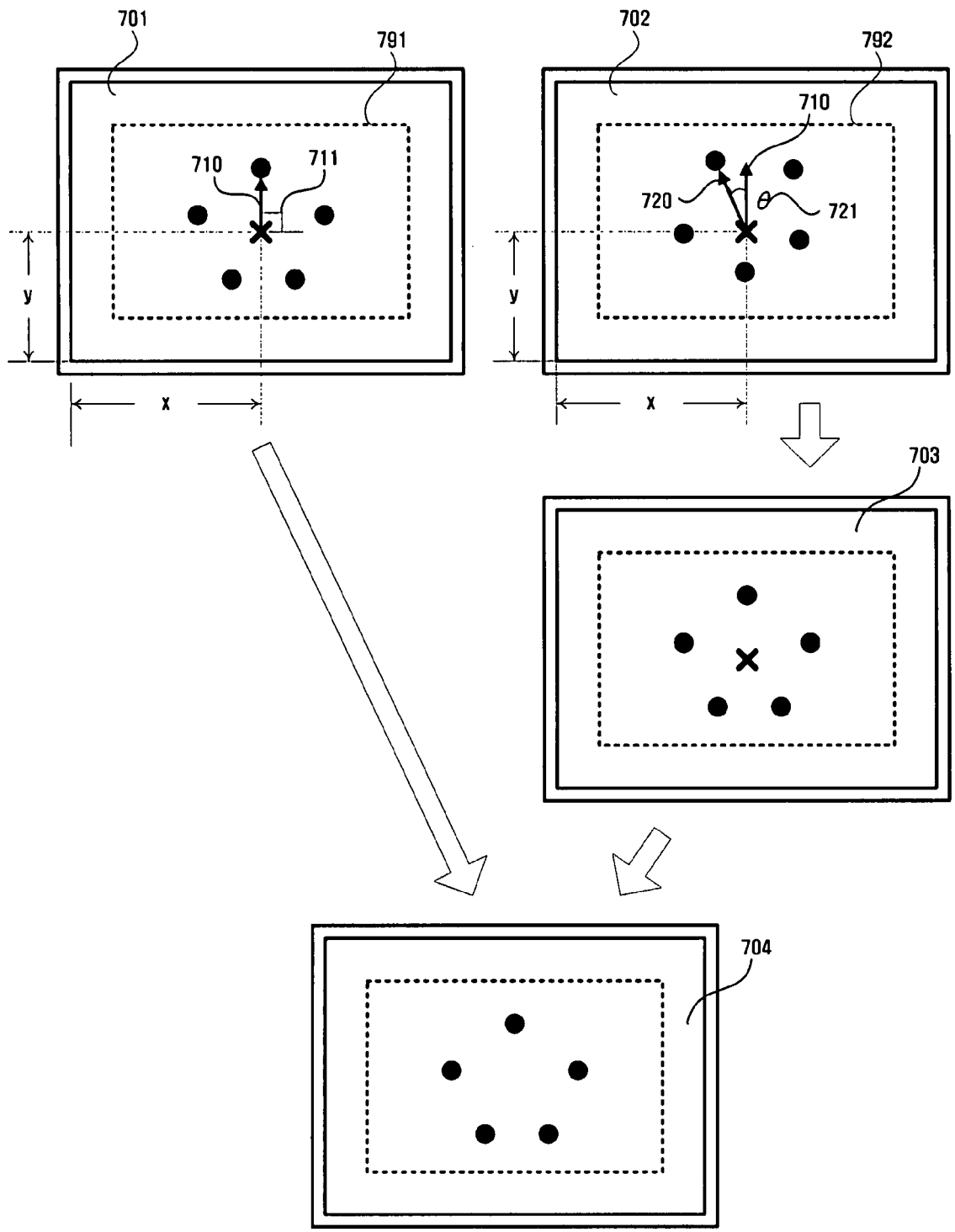
FIG. 7 illustrates a rotation error correction, according to one or more embodiments of the present invention.

FIG. 7 illustrates a rotation error correction according to one or more embodiments of the present invention, and shows a left image 701 and a right image 702 in which no vertical error exists and only a rotation error exists, as an example.

In FIG. 7, feature point extraction areas 791 and 792 generated by the area-generator 220 are respectively disposed in the left image 701 and the right image 702 in the same position, size and shape. Further, the feature-point extractor 230 extracts feature points, and the representative-vector determiner 250 determines representative vectors 710 and 720, respectively, of the left image 701 and the right image 702.

Accordingly, and continuing the example, the vectors 710 and 720, which are nearly vertical in the left image 701 and the right image 702, are determined as representative vectors, respectively, and are transferred to the error-calculation unit 260. Further, the error-calculation unit 260 confirms angle and size differences between the representative vectors of the left image 701 and the right image 702. The error-calculation unit 260 confirms that a difference exists in the angles of the representative vectors 710 and 720. That is, the error-calculation unit 260 confirms that the representative vector of the left image 701 has an angle 711 perpendicular to a screen and the representative vector of the right image 702 has an angle 721 of θ with respect to the vertical line of a screen. As a result, the error-calculation unit 260 confirms that an error between the left image 701 and the right image 702 corresponds to θ.

The error between the left image 701 and the right image 702, which is calculated by the error-calculation unit 260, may be transferred to the error-correction unit 270. The error-correction unit 270 may perform a geometrical transformation for the right image 702 based on the received error. That is, the error-correction unit 270 may rotate the right image 602 by θ. In this way, the left image 701, which corresponds to a reference image, and the corrected right image 703 may be transferred to the display unit 280. Accordingly, the display unit 280 may display the received synthesized image 704.

In FIG. 7, the left image 701 is set as a reference image and an image correction is performed for the right image 702. However, the right image 702 may be set as a reference image and an image correction may be performed for the left image 701. Further, an image correction may also be performed for the left image 701 and the right image 702 by half of the error between the left image 701 and the right image 702. That is, the left image 701 may be rotated clockwise by θ/2 and the right image 702 may be rotated counterclockwise by θ/2.

FIG. 8 illustrates a process for displaying a stereo image according to one or more embodiments of the present invention.

In order to display a stereo image, the image-input unit 210 of the stereo image apparatus 200, for example, may receive a 2D image, in operation S810. The 2D image may include a left image and a right image so that the 2D image may be converted to a stereo image.

After the image is input, the area-generator 220, for example, may generate feature point extraction areas for extracting feature points of graphics objects included in the left image and the right image, in operation S820. The feature point extraction area may correspond to an entire area or a partial area of the left image or the right image. When the feature point extraction area corresponds to a partial area, the size, shape and position of the feature point extraction area may be manually determined by a user or may also be automatically determined by the area-generator 220, for example. When the size, shape and position of the feature point extraction area are automatically determined, the area-generator 220, thus, may refer to the characteristics of the graphics objects included in the image. That is, in an embodiment, the area-generator 220 may generate an area including a graphics object with a relatively high frequency as the feature point extraction area, for example.

The generated feature point extraction area may be transferred to the feature-point extractor 230, for example, such that the feature-point extractor 230 may extract feature points of graphics objects included in the feature point extraction areas of the left image and the right image, in operation S830, for example.

The extracted feature points may be transferred to the polygon generator 240, for example, such that the polygon generator 240 may generate a polygon in which the feature points of the graphics objects are interconnected, in operation S840.

Further, the extracted feature points may be transferred to the representative-vector determiner 250, for example, such that the representative-vector determiner 250 may determine a representative vector among vectors between a reference point and the feature points, in operation S850. The reference point may correspond to a specific point determined by a user, the center of the polygon, or one of the feature points.

The representative vector of the left image and the representative vector of the right image may be transferred to the error-calculation unit 260, for example, such that the error-calculation unit 260 may calculate an error between the left image and the right image using a difference between the representative vectors, in operation S860. That is, the error-calculation unit 260 may calculate a vertical error or a rotation error, and may also calculate a horizontal error, for example.

The calculated error may be transferred to the error-correction unit 270, for example, such that the error-correction unit 270 may correct the vertical error or the rotation error between the left image and the right image using the received error, in operation S870, for example. In this embodiment, the error-correction unit 270 may perform a geometrical transformation for the left image or the right image, thereby reducing the vertical error or the rotation error. The error-correction unit 270 may set the left image or the right image as a reference image, and may perform a correction for the right image or the left image. Further, the error-correction unit 270 may also perform a correction for both the left image and the right image, for example.

The corrected image may be transferred to the display unit 280, for example, such that the display unit 280 may display the corrected image, in operation S880. Here, the display unit 280 may display a synthesis image of the reference image and the corrected image. When both the left image and the right image are displayed, the display unit 280 may also synthesize the left image and the corrected right image and display the synthesized image.

The displayed image may be transferred to the stereo-optical unit 290, for example, such that the stereo-optical unit 290 may divide the displayed synthesis image into a left image and a right image, in operation S890. Consequently, a user may observe a stereo image. In an embodiment, the division of the image, the stereo-optical unit 290 may generate a stereo image for naked eyes using a parallax barrier method or a lenticular method, for example. Further, the stereo-optical unit 290 may also generate a stereo image for glasses using a polarization method and a time-division method, for example.

In addition to this discussion, one or more embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media, as well as through the Internet, for example. Here, the medium may further be a signal, such as a resultant signal or bitstream, according to one or more embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

According to an apparatus, method and medium for displaying a stereo image based on one or more embodiments of the present invention as described above, predetermined areas are respectively set in a left image and a right image, which make up a stereo image, and a vertical error and a rotation error of the left image and the right image are corrected using vector differences of polygons displayed in each area, so that it is possible to reduce eye fatigue experienced by a user.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to display a stereo image, comprising:
   a feature-point extractor to extract feature points of graphics objects included in a left image and a right image, included in a stereo image;
   a representative-vector determiner to determine a representative vector among vectors between a predetermined point and the feature points for the left image and the right image, respectively; and
   an error-correction unit to correct at least one of a vertical error and a rotation error between the left image and the right image using a difference between the representative vector determined in the left image and the representative vector determined in the right image.

2. The apparatus of claim 1, wherein the feature points comprise feature points of the graphics objects included in predetermined areas of the left image and the right image.

3. The apparatus of claim 2, further comprising an area-generator for generating the predetermined areas.

4. The apparatus of claim 1, wherein respective representative vectors comprise a vector that is nearly vertical or horizontal, among the vectors between a center of a polygon, which is generated based on the feature points.

5. The apparatus of claim 1, wherein at least one representative vector is determined.

6. The apparatus of claim 1, wherein the error-correction unit sets one of the left image and the right image as a reference image and vertically shifts the corresponding right image or the left image, which is not the reference image, with respect to the reference image, thereby correcting the vertical error.

7. The apparatus of claim 1, wherein the error-correction unit sets one of the left image and the right image as a reference image, and rotates the corresponding right image or the left image, which is not the reference image, with respect to the reference image, thereby correcting the rotation error.

8. The apparatus of claim 1, wherein, the error-correction unit corrects the vertical error or the rotation error when the difference between the representative vectors meets a predetermined threshold value.

9. The apparatus of claim 1, further comprising a display unit to display the left image and the right image for which at least one of the vertical error and the rotation error has been corrected.

10. The apparatus of claim 1, further comprising a stereo-optical unit to optically divide the displayed left image and right image.

11. The apparatus of claim 10, wherein the stereo-optical unit optically divides the displayed left image and right image using at least one of a parallax barrier operation, a lenticular operation, a polarization operation and a time-division operation.

12. A method of displaying a stereo image, comprising:
    extracting feature points of graphics objects included in a left image and a right image, included in a stereo image by a feature-point extractor;
    determining a representative vector among vectors between a predetermined point and the feature points for the left image and the right image, respectively, by a representative-vector determiner; and
    correcting at least one of a vertical error and a rotation error between the left image and the right image using a difference between the representative vector determined in the left image and the representative vector determined in the right image by way of an error-correction unit, wherein the method is performed using a processor or a computer.

13. The method of claim 12, wherein the feature points comprise feature points of the graphics objects included in predetermined areas of the left image and the right image.

14. The method of claim 13, further comprising generating the predetermined areas.

15. The method of claim 12, wherein respective representative vectors comprise a vector, which is nearly vertical or horizontal, among the vectors between a center of a polygon, which is generated based on the feature points.

16. The method of claim 12, wherein at least one representative vector is determined.

17. The method of claim 12, wherein the correcting of the at least one of the vertical error and the rotation error involves one of the left image and the right image being set as a reference image, and the corresponding right image or the left image, which is not the reference image, being vertically shifted with respect to the reference image, so that the vertical error is corrected.

18. The method of claim 12, wherein the correcting of the at least one of the vertical error and the rotation error involves one of the left image and the right image being set as a reference image, and the corresponding right image or the left image, which is not the reference image, being rotated with respect to the reference image, so that the rotation error is corrected.

19. The method of claim 12, wherein, the correcting of the at least one of the vertical error and the rotation error involves the vertical error or the rotation error being corrected when the difference between the representative vectors meets a predetermined threshold value.

20. The method of claim 12, further comprising optically dividing the displayed left image and right image by way of a stereo-optical unit.

21. The method of claim 20, wherein the optically dividing involves the displayed left image and right image being optically divided using at least one of a parallax barrier method, a lenticular method, a polarization method and a time-division method.

22. The method of claim 12, further comprising displaying the left image and the right image, for which at least one of the vertical error and the rotation error has been corrected by way of a display unit.

23. At least one non-transitory computer-readable medium comprising computer readable code to control at least one processing element to implement the method of claim 12.

* * * * *